United States Patent [19]

Hatanaka et al.

[11] Patent Number: 5,003,406

[45] Date of Patent: Mar. 26, 1991

[54] VIDEO IMAGE REPRODUCING APPARATUS WHICH ELIMINATES A NOISE BAR IN THE IMAGE BY USING A FIELD MEMORY

[75] Inventors: Keiji Hatanaka; Yoshimitsu Nakajima; Masami Itoga, all of Kyoto, Japan

[73] Assignee: Mitsubishi Denki Kabushiki Kaisha, Tokyo, Japan

[21] Appl. No.: 160,603

[22] PCT Filed: May 28, 1987

[86] PCT No.: PCT/JP87/00344

§ 371 Date: Mar. 28, 1988

§ 102(e) Date: Mar. 28, 1988

[87] PCT Pub. No.: WO87/07461

PCT Pub. Date: Dec. 3, 1987

[30] Foreign Application Priority Data

May 28, 1986 [JP] Japan .................. 61-124029
Sep. 25, 1986 [JP] Japan .................. 61-228726
Sep. 25, 1986 [JP] Japan .................. 61-228727
Sep. 25, 1986 [JP] Japan .................. 61-228728

[51] Int. Cl.⁵ ............................ H04N 5/782
[52] U.S. Cl. .................. 360/10.2; 360/10.3; 360/77.12
[58] Field of Search ............ 360/10.1, 10.3, 77.12, 360/77.13, 77.14, 77.15

[56] References Cited

U.S. PATENT DOCUMENTS 4,811,130 3/1989 Takayama .................. 360/10.3

FOREIGN PATENT DOCUMENTS

54-62719 5/1979 Japan .
56-90684 7/1981 Japan .
59-213004 12/1984 Japan .................. 360/10.3
2185615 7/1987 United Kingdom .......... 360/10.3

Primary Examiner—Robert L. Richardson
Attorney, Agent, or Firm—Sughrue, Mion, Zinn, Macpeak & Seas

[57] ABSTRACT

This invention relates to a video image reproducing apparatus operable to reproduce a video image signal recorded on a magnetic tape through a field memory at a different speed from a recording speed. An envelope detecting signal of a reproducing signal from a magnetic head is compared with a reference potential by a comparator in order to automatically control the write timing to the field memory. The reference potential is adjusted based on an output signal of the comparator. The write timing to the field memory is controlled in accordance with an output signal of the comparator which compares the envelope detecting signal with the adjusted reference voltage. The apparatus of the invention is to be used in a video tape recorder.

20 Claims, 8 Drawing Sheets

VIDEO IMAGE REPRODUCING APPARATUS WHICH ELIMINATES A NOISE BAR IN THE IMAGE BY USING A FIELD MEMORY

FIELD OF THE ART

This invention relates to a video image picture reproducing apparatus for eliminating a noise bar by employing a field memory.

BACKGROUND OF THE ART

As an example of a conventional video image reproducing apparatus, a high speed reproducing operation of a video tape recorder employing a field memory (hereinafter referred to as a VTR) will be described with reference to even multiplied speed reproduction such as reproducing at four times the recorded speed. An odd multiplied speed is generally selected in the high speed reproducing. This is because the odd multiplied speed reproducing has such a characteristic that a noise bar is locked since a noise position is identical in each field. On the other hand, a width of a noise bar can be made narrow, in some cases, by employing a memory. This is because the even multiplied speed reproducing has such a characteristic that a noise position and a signal position occur alternately.

Figure 1:
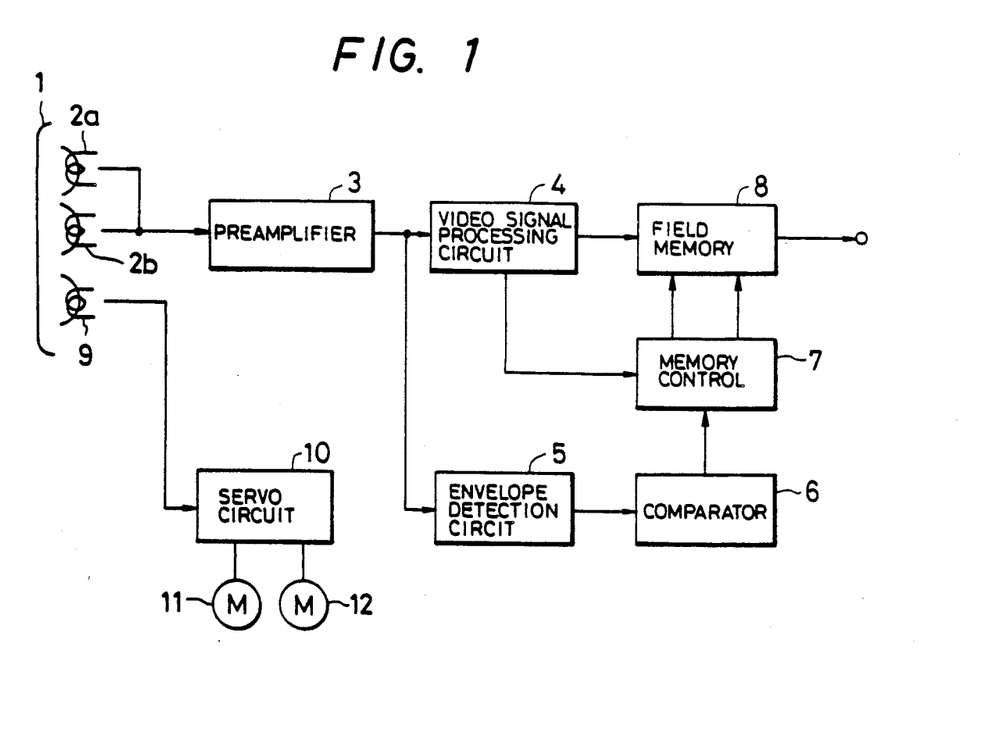
FIG. 1 is a block diagram showing a video image reproducing apparatus of the prior art.

FIG. 1 is a block diagram showing the high speed reproducing system of the above described conventional VTR. In FIG. 1, reference numeral (1) is a recorded video tape. A reproducing signal is fed to a preamplifier (3) through video heads (2a) and (2b). Thereafter, the reproducing signal is applied to a video signal processing circuit (4). Reference numeral (5) is an envelope detecting circuit which picks out an envelope of the reproducing signal from an output of the preamplifier (3). An output signal of the envelope detecting circuit (5) is applied to a comparator (6) to be compared with a given constant level signal.

Reference numeral (7) is a memory control circuit which receives the output signal of the comparator (6) and generates a timing signal and an address signal for writing an output signal from the video signal processing circuit (4) on a field memory (8) in response to the output of the comparator (6). The video signal processing circuit (4) produces a synchronizing signal to the memory control circuit (7).

The field memory (8) is a dual-port memory (not shown in the drawing) having a random output and a serial output as an output port. Writing and reading operations can be performed asynchronously by using the serial port. In this case, a reading operation for reading a content of the field memory (8) is carried out asynchronously by the use of the signal port, while the reproducing signal from the video signal processing circuit (4) is written to the field memory (8).

Reference numeral (9) is a control head. A servo circuit (10) controls a capstan motor (11) and a reel motor (12) based on an output signal of the control head (9) to thereby control the running of the tape in each mode.

An operation of the video image reproducing apparatus constructed above will be described hereinbelow.

Figure 2:
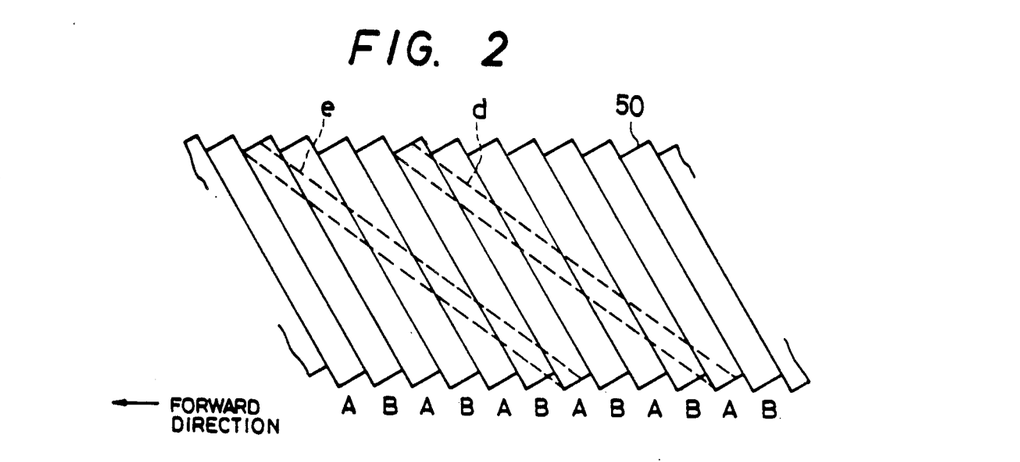
FIG. 2 is a diagram showing a locus of a head when a guardless recorded video track is played back at a high reproducing speed by a two head type video image reproducing apparatus.
Figure 3:
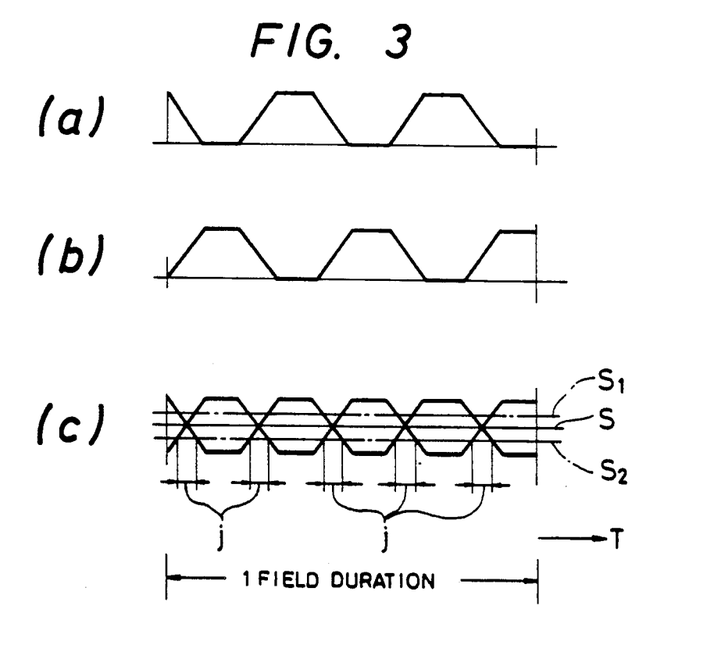
FIG. 3 consisting of (a)-(c), is a waveform diagram showing reproducing output signals from a preamplifier in reproduction of the video tape shown in FIG. 2.

The video tape (1) is played back in a reverse direction at a high speed (of four times the recorded speed, for instance). FIGS. 2 and 3 are explanatory diagrams of the operation when the video tape (1) is played back in the reverse direction at four times the recorded speed. In FIG. 2, reference numeral (50) is a video track and reference characters (A) and (B) designate azimuth recording, respectively. The video head (2a) moves along the azimuth (A) whereas the video head (2b) moves along the azimuth (B).

When the video head (2a) traces along the azimuth shown by broken lines (d) in FIG. 2, the reproducing signal of the preamplifier (3) is as shown in FIG. 3(a) due to the azimuth recording. However, the video head (2a) and the video head (2b) are used both in a first mode and a second mode in which a tape feeding speed is slower than that of the first mode. A head width is narrower than a tracking pitch in the first mode.

When the video head (2b) traces a locus indicated by broken lines (e) of FIG. 2, an output signal of the video head (2b) is as shown in FIG. 3(b). The contents of the two fields of FIG. 3(a) and (b) are interpolated with each other on a time base, so that one field image is obtained as shown in FIG. 3(c). The one field image is stored in the field memory (8) and displayed on a monitor. The envelope waveform shown in FIGS. 3(a) to 3(c) shows only an upper side of alternating waveforms which are symmetrical with respect to the upper and the lower sides.

Figure 4:
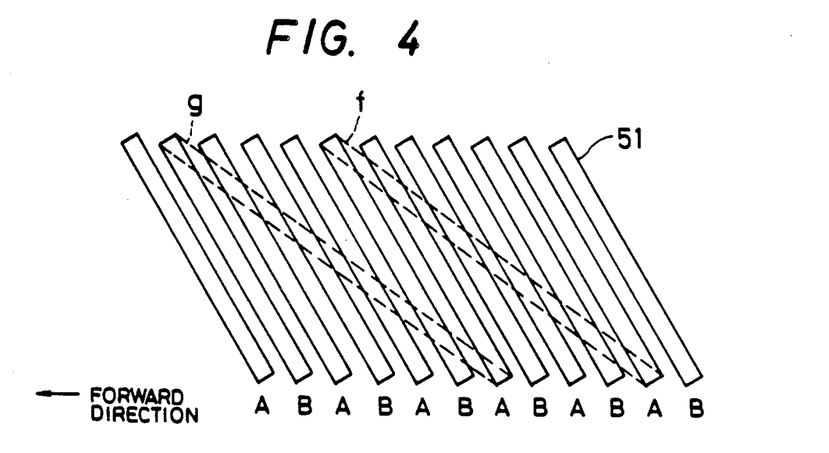
FIG. 4 is a diagram showing a locus of a head when a guard band recorded video track is played back at a high reproducing speed by a two head type video image reproducing apparatus.

Thus noiseless content of one field can be obtained in the case where there is no guard band in the video tape. The guard band is, however, formed on the video track (50) when the first mode recording is performed by the two above described system of two head type whose head width is narrower than the track pitch in the first mode. As a result, the video tracks (51) are created as shown in FIG. 4. When the video heads (2a) and (2b) trace on the video tracks (51) along loci (f) and (g) shown by broken lines of FIG. 4 respectively, the outputs of the preamplifier (3) are shown in FIGS. 5(a) and 5(b). The video signal of one field is as shown in FIG. 5(c) when the output signals of the preamplifier (3) are interpolated with each other on the time base.

Figure 5:
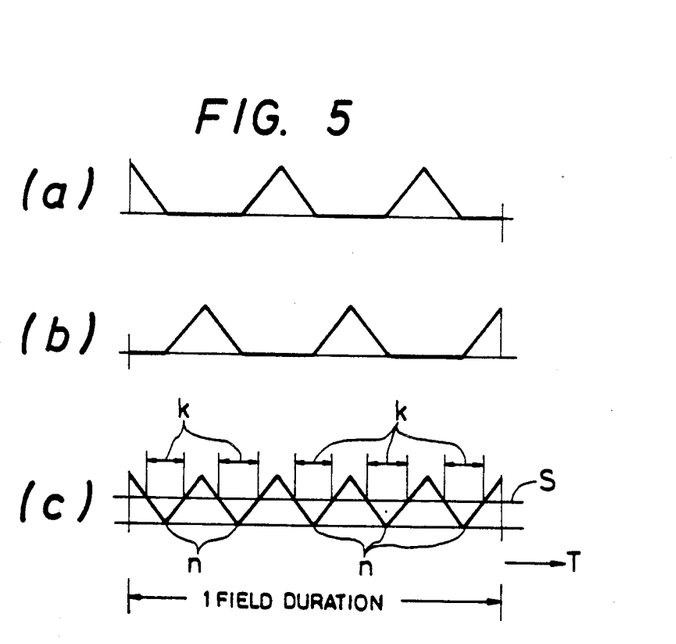
FIG. 5 consisting of (a)-(c), is a waveform diagram showing waveforms of reproducing output signals of a preamplifier when a tape is played back as in the case of FIG. 4.

It is, however, necessary to change a comparison potential of the comparator (6) when the video signals are interpolated on the time base as shown in FIGS. 3(c) and 5(c), respectively. Namely, the comparison potential must be set to a potential (S) shown in FIG. 3(c). This is because an image information at the time duration (J) is neglected when the comparing reference potential is set to a level (S1) higher than the level (S). This results in an occurrence of the noise bar in the time duration (J). On the contrary, the contents are rewritten in every field at the time duration (J), when the comparing voltage is set to a level (S2) lower than the level (S). Therefore, the image corresponding to the (J) portions are disturbed. Accordingly, the image information is reproduced smoothly by setting the comparing reference potential of the comparator (6) to the above described potential (S).

The noise bar, however, appears at the time durations (K) shown in FIG. 5(c) if the potential corresponding to the level (S) is set to the comparator (6) as in the case mentioned above. In this instance, the information cannot be obtained in the time duration (n) as a signal, even when the interpolated picture information is made continuous by employing, for example, zero (0) potential of the comparator (6). This results in degrading an S/N ratio and an occurrence of a noise having a certain noise width. In more detail, the envelope signal cannot be picked up sufficiently even when the potential of the comparator (6) is suitable, because the video heads (2a) and (2b) are also used for the second mode and their head widths are narrow. Therefore, the wrong S/N ratio portions appear in the (n) portions.

In view of the above, assuming that video heads whose head width is sufficiently large, are used, when the speed search is carried out in the second mode, it is disadvantageous that adjacent signals may be reproduced resulting in an occurrence of a noise in an image reproduced due to cross talk.

SUMMARY OF THE INVENTION

With the conventional apparatus thus constructed above, it was necessary to perform troublesome operation such as manual adjustment of a comparing reference voltage of the comparator while watching the reproduced image in order to make the width of the noise bar narrower.

Further, a problem accompanying the conventional head construction using two heads in both the first mode and the second mode is that it is impossible to make the width of the noise bar narrow in both the first and second modes. Consequently, it is necessary to manually adjust the comparison voltage of the comparator while watching the reproduced image in every switching of the first and the second modes.

Moreover, the conventional apparatus is disadvantageous in that the noise bar can be removed by manually adjusting in the second mode, but such removing of the noise bar cannot be removed manually in the first mode.

It is, therefore, an object of this invention to provide a video image reproducing apparatus which can obtain a good quality video image by making the noise bar width of a reproducing signal from a field memory minimum, even when the width of a picture recording track differs in every tape.

It is another object of the invention to provide a video image reproducing apparatus which can obtain a high quality reproduced video image by making the width of a noise bar of a reproducing signal minimum, even if the video tapes used are various in the time width of a lower portion than a predetermined level of the signal obtained when envelope signals are interpolated with each other on a time base between two fields.

It is a further object of the invention to provide a video image reproducing apparatus which can obtain a high quality video image by making the width of a noise bar of a reproducing signal obtained from a field memory minimum in the high speed reproducing for both of the first and the second modes, even when a recording track width on a tape differs in each tape.

It is still another object of the invention to provide a video image reproducing apparatus which can obtain a high quality reproduced video image in any one of the first and the second modes by making the width of a noise bar minimum, even when the time width of a portion of which level is lower than that of a signal obtained by interpolating envelope signals with each other on a time base between two fields differs in each tape.

According to the present invention, a recording track width on a tape is measured by means of an envelope detecting signal and an optimum potential is supplied to the comparator as a comparison potential based on the measured result.

Further, according to the invention, a time width is measured of a portion of which level is lower than that of a predetermined level of a signal obtained by interpolating envelope signals with each other on a time base between two fields. As a result of the measurement, the comparison voltage of a comparator is adjusted to the most suitable potential for the reproducing signal.

According to the invention, a video image reproducing apparatus comprises exclusive magnetic heads for respective reproducing modes, wherein the magnetic heads are selected in accordance with a mode discriminating signal, a recording track width on a tape is detected by an envelope detecting signal and the optimum potential is supplied to a comparator as a comparison potential based on the detecting result.

According to the invention, the video image reproducing apparatus is equipped with exclusive magnetic heads for respective reproducing modes, wherein the magnetic heads are automatically selected by a discriminating signal obtained by discriminating means, measured is a time width of a portion of which level is lower than the predetermined level of a signal obtained when envelope signals are interpolated with each other on a time base, and a comparison potential of the comparator is made the most suitable potential for the reproducing signal.

Accordingly, this invention has such an advantage that a video image having high quality can be obtained easily by adjusting a comparison potential of a comparator to an optimum potential most suitable for the reproduction automatically, without the troublesome operation of manually making the noise bar width narrow while watching the reproduced video image.

BRIEF DESCRIPTION OF THE DRAWING

FIGS. 9(a) and (b) are waveform diagrams showing waveforms for explanation of the operation of a video image reproducing apparatus according to this invention;

FIGS. 11(a) and (b) are waveform diagrams showing waveforms for explanation of the operation of another embodiment of this invention;

THE BEST MODE FOR EMBODYING THE INVENTION

An embodiment of the present invention will be described hereinbelow with reference to the accompanying drawings.

Figure 8:
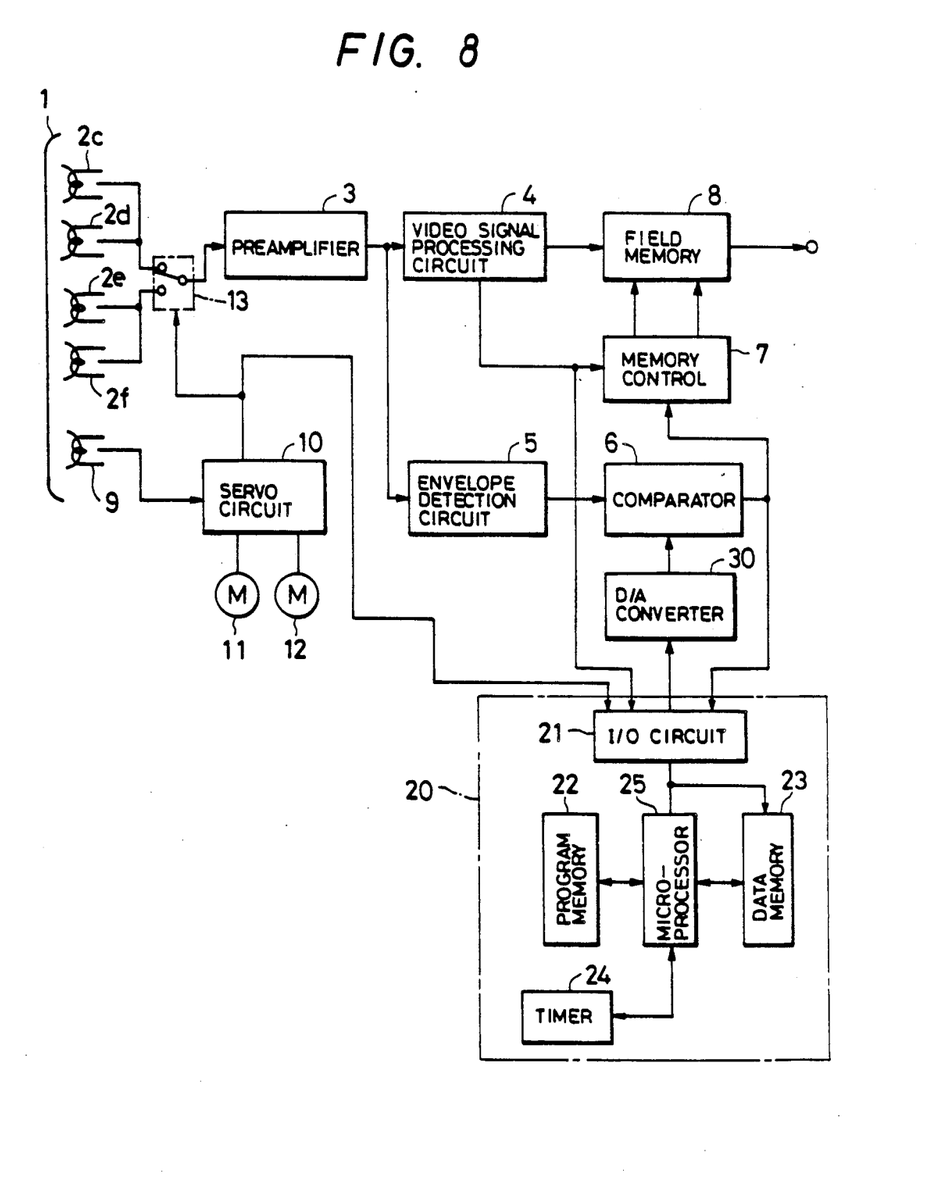
FIG. 8 is a block diagram showing an embodiment of a video image reproducing apparatus according to the present invention.

FIG. 8 is a block diagram showing a construction of an embodiment of a video image reproducing apparatus according to the present invention wherein parts which are the same as those of the conventional apparatus shown in FIG. 1 bear the same reference numerals, and detailed description therefore will be omitted.

In FIG. 8, reference numerals (2c) and (2d) denote heads for the first mode, and reference numerals (2e) and (2f) designate heads for the second mode. These heads are switched by a switch (13) in accordance with a discriminating signal output from a servo circuit (10) in response to an output signal of a control head (9). Reference numeral (20) denotes a one-chip microcomputer (hereinafter refered to merely as a micon). The micon comprises an input/output (I/O) circuit (21) receiving a synchronizing signal from the video signal processing circuit (4) and an output signal from the comparator (6), outputting an optimum potential to the comparator (6) through a D/A converter (30) and receiving a mode discriminating signal supplied by a servo circuit (10), a data memory (23) for storing data temporarily, a timer (24) having timer functions and a timer memory, a microprocessor (25) for executing arithmetic operations and a program memory (22) for instructing the operations. Further, the micon (20) and the comparator (6) constitute a detecting means for detecting a width of a video image recording track on a video tape (1). The micon (20) and the D/A converter (30) constitute first and second level setting a means for setting comparison voltage in the comparator (6). The micon (20) serves as a level setting switching means.

Next, the operation will be described.

When the reproducing operation is set to the first mode, a mode changing signal (a mode discriminating signal) is output from the servo circuit (10) in response to the output signal of the control head (9), so that the switch (13) is switched to select the video heads (2c) and (2d) for the first mode operation. The video heads (2c) and (2d) trace in the reverse direction thereof at four times the recording speed the loci (h) and (i) of the video track (52) on the video tape (1) shown in FIG. 6. In this instance, the head (2c) traces the azimuth (C) whereas the head (2d) traces the azimuth (D) to obtain the reproducing envelope signals shown in FIGS. 7(a) and 7(b). In this case, an envelope shown in FIG. 7(c) is obtained by interpolating the envelopes of FIGS. 7(a) and 7(b) on a time base by means of recording and reproducing the video track having a guard band. The difference between the envelope of FIG. 7(c) and the envelope of FIG. 4(c) obtained by recording and reproducing the same video track recorded with the same guard band is that a head width can be made large in the case of FIG. 7 without considering an influence against the second mode, since an exclusive head for the first mode is employed, and a sufficient S/N ratio can be obtained at (m) portions of FIG. 7(c), while it cannot be obtained at (n) portions of FIG. 5(c). The micon (20) produces an output to the comparator (6) through the A/D converter (30) to set a one-third potential of the envelope signal of FIG. 7(c) to the comparator (6). In this case, the one-third potential is previously known since the maximum potential is approximately set in the preamplifier (3). The one-third potential of the maximum potential is selected as a reference voltage for comparison in view of the margin of the moise in the reproduced signal and the superpose of a DC component by the envelope detecting circuit (5).

FIGS. 9(a) and 9(b) show two field outputs obtained from the comparator (6) when the one-third potential is supplied to the comparator (6) as the comparison potential. The logic levels of FIGS. 9(a) and 9(b) directly show the writing mode (level H) and reading mode (level L).

In this case, the writing mode and the reading mode are available for the random input port and the random output port of the dual-port memory employed in the field memory (8) mentioned above. Where the reading mode means that the content of the memory is read out but is not written. Namely, it is on the assumption that the content of the memory as an instinct reading mode is performed by using the serial port, and the random input operation is performed asynchronously.

In this case, the width of the tape where the signal is recorded is detected by measuring the time durations (T1) and (T2) of the level L shown in FIGS. 9(a) and 9(b). In more detail, it is understood that the recording track width is large when the time duration (T1) or (T2) where the signal is a low level is long, whereas the recording width is small when the time duration is short. The measurement of the time duration (T1) and (T2) is carried out over the two fields, because the signals are possibly recorded by a different head width in each field. In this case, a value of the time duration (T1) is not equal to that of the time duration (T2) accordingly. The optimum potential corresponding to each track width is set through the D/A converter (30) to the comparator (6) by referring a reference table where the optimum potentials to be supplied to the comparator (6) are preset based on the durations (T1) and (T2) under an assumption that the signal is previously recorded with the various track width. The table mentioned above is previously written in the program memory (22) of the micon (20).

Figure 6:
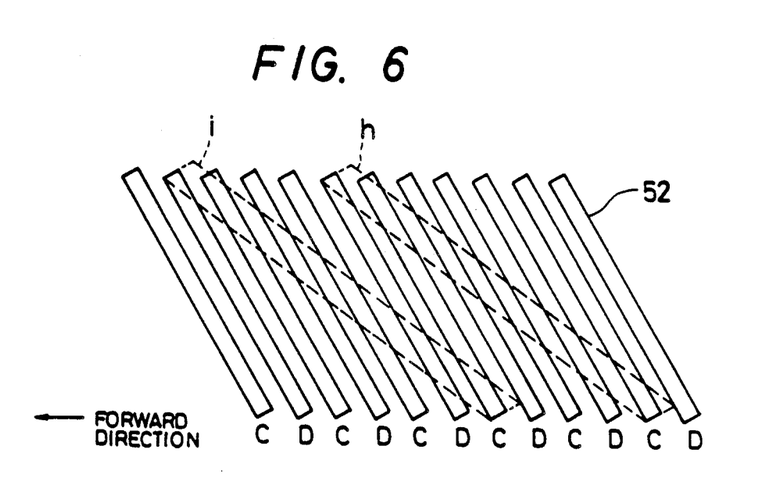
FIG. 6 is a diagram showing a locus of a head when a guard band recorded video track is played back at a high reproducing speed by a head having a width larger than a track pit.
Figure 7:
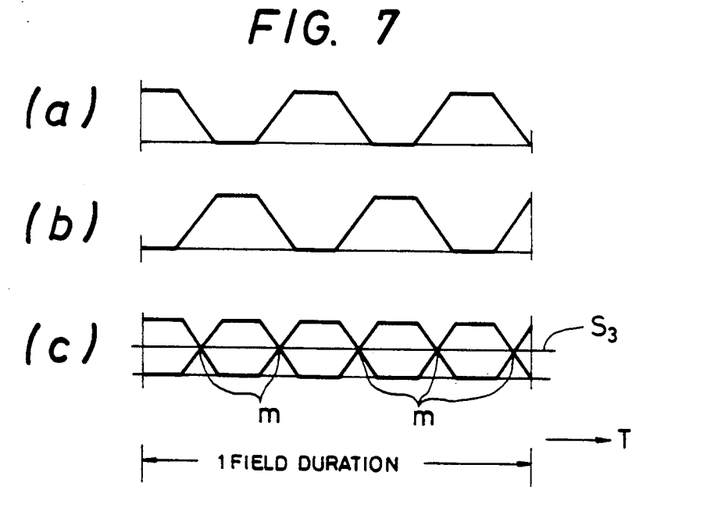
FIG. 7, consisting of (a)-(c), is a waveform diagram showing reproducing output signals of a preamplifier when the reproduction is carried out as in the case of FIG. 6.

Written on the field memory (8) is the reproducing signal in which the envelope interpolated in every field is smoothly continuous and a high quality reproducing video image having a narrowest width noise bar is obtained by supplying as a reference voltage, the potential of the level indicated by the waveform (S3) of FIG. 7(c) with respect to the tape where the signal is recorded on the track (52) of FIG. 6 by referring to the reference table, or by supplying the optimum potential to the comparator (6) by referring to the reference table again with respect to the tape having the different widths of the recording track after measurement of the (T1) and (T2). In the second mode, the same operation is also carried out by switching the switch (13) to select the video heads (2e) and (2f) so that the same advantage is obtained as mentioned above.

The operation will be described with reference to a flowchart shown in FIG. 10, where the vertical synchronizing signal is standardized on the time base and the signal is of a low level L during a vertical blanking time interval.

Figure 9:
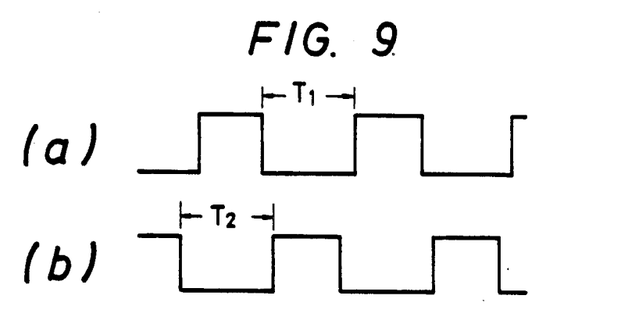
Figure 10:
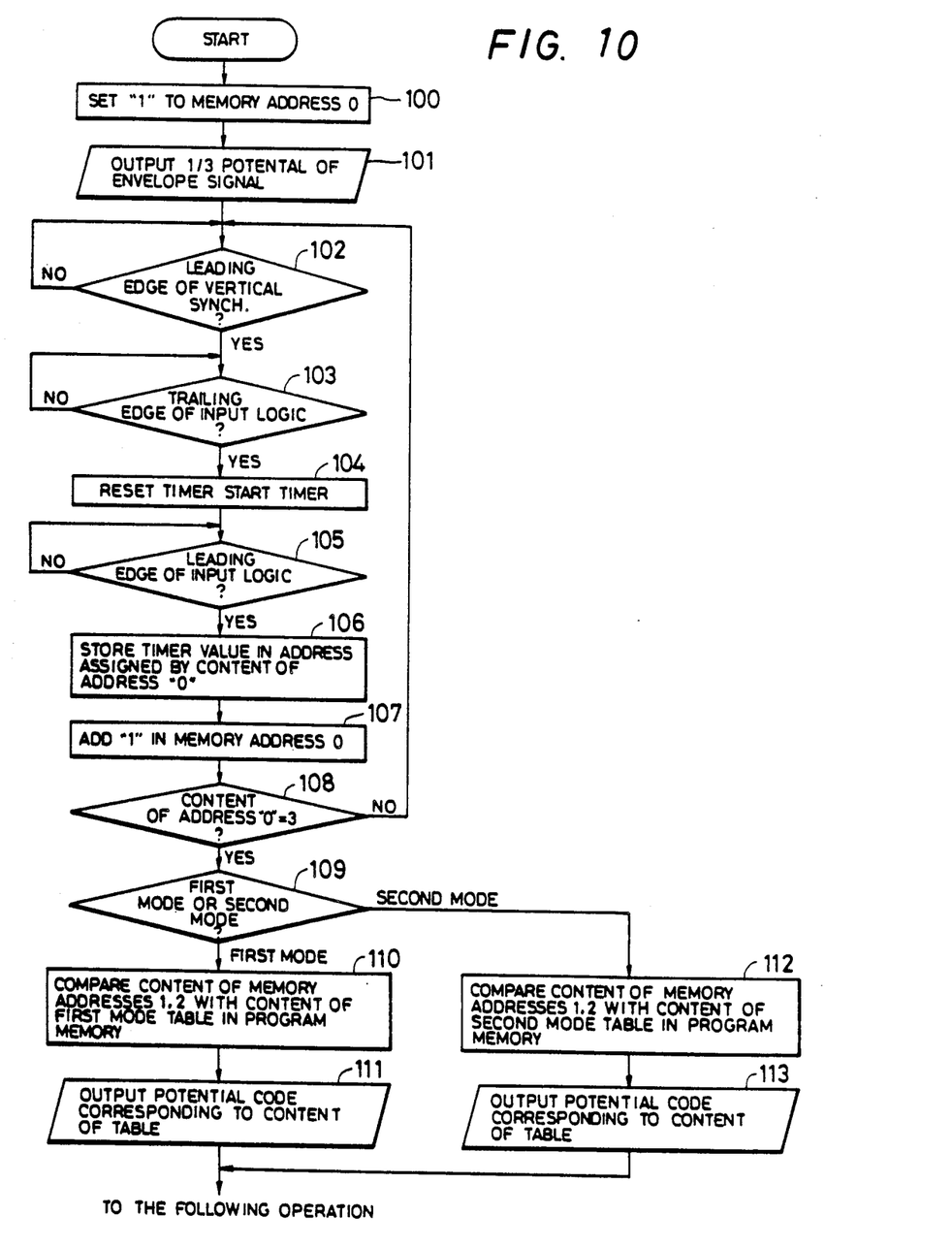
FIG. 10 is a flowchart showing the operation of a video image reproducing apparatus according to this invention.

In the flowchart of FIG. 10, the data memory (23) in the micon (20) is first initialized so as to set "1" in an address "0" (step (100)). Next, a potential code is output to the D/A converter (30) through the I/O circuit (21) in order to supply one-third of the maximum potential of the envelope signal to the comparator (6) (step (101)). When the front edge of the vertical synchronizing signal obtained from the video signal processing circuit (4) is detected after the initializing (step 102), the trailing edge of the output signal of the comparator (6) is detected in order to write the data of the field memory (8) (step (103)). Upon detection of the trailing edge thereof, the timer (24) in the micon (20) is reset to start the timer (24) (step 104). In the case where both the front edge of the vertical synchronizing signal and the trailing edge of the output signal of the comparator (6) are not detected, operation is suspended until the edges thereof are detected. After the start of operation of the timer, the microprocessor (25) detects the front edge of the output signal of the comparator (6) and then decides whether the output signal of the comparator (6) is inverted or not (step (105)). The operation is suspended until the front edge thereof is detected. Upon the detection of the front edge thereof, the timer value of the timer (24) in the micon (20) is stored in an address assigned by the content of the address 0 of the data memory (23) (step 106) and "1" is then added to the content of the address 0 (step 107). In other words, the content of the address 0 becomes "2" after the value of the timer is written in the address 1 of the memory assigned in the step (100). Thereafter, it is detected whether the content of the address 0 is "3" or not (step (108)). In this case, the operation of the micon (20) is returned to the step (102), since the content of the address 0 has been set to "2". Furthermore, the measurement in the second field is executed similarly to that of the first field. Accordingly, the content of the address 0 has been reset to "3" in the step (107) and the operation advances from step 108 to step 109. After all, the step (108) is the processing step in which it is detected whether the measurement for the two fields is accomplished or not. At this time, the time intervals (T1) and (T2) for the waveformes (a) and (b) shown in FIG. 9 are measured, respectively. The values corresponding to the time intervals (T1) and (T2) are written in the addresses 1 and 2 of the program memory (22), respectively.

Next, it is detected whether the operation is in the first mode or in the second mode based on the discriminating signal from the servo circuit (10) (step (109)). In this case, when it is detected that the operation is in the first mode, the operation advances to the next step (110) where the measured contents which are the contents stored in the addresses 1 and 2 in the data memory (23) are compared with the table values which have been stored in the areas of the program memory (22) of the micon (20). Recorded in the reference table of program memory (22) is the optimum comparison potential to the comparator (6) which has been calculated experimentally corresponding to the recording track width of the tape in the first mode on the tape. Accordingly, the optimum potential corresponding to the recording track width is selected from the reference table, and the potential code corresponding thereto is output (step 111). The code is a BCD code represented by a binary number. Moreover, when it is detected that the operation is in the second mode in the step (109), the operation advances to the step (112). As is similar to the operation in the first mode, the contents of the addresses 1 and 2 of the data memory (23) are compared with the contents for the second mode in the reference table to output the potential code corresponding to the content of the reference table (step (113)).

Although one-third of the maximum potential of the envelope is employed as the comparison potential of the comparator in the step (101) of FIG. 10 in the above embodiment, it should be noted that this potential is not restricted to the one-third potential, but any positive potential which is lower than the maximum potential may be employed.

Next, the description will be made with reference to another embodiment wherein a level of the comparison potential of the comparator (6) is adjusted based on the time width of a signal having a level lower than the predetermined level of the signal, the signal being obtained by interpolating the envelope signals between two fields on a time axis base.

In FIG. 8, a measurement mean comprises the micon (20) and the comparator (6), which measures the time widths of portions of a signal whose levels are lower than the predetermined level obtained by interpolating the envelope signals with each other on the time axis base between two fields. The micon (20) and the D/A converter (30) constitute a level setting means for setting the level of the comparison voltage to be supplied to the comparator (6), and a switching means for switching the mode between the first mode and the second mode comprises the micon (20), the switch (13) and the servo circuit (10).

The operation will be described hereinafter.

When the reproducing operation is in the first mode, a mode switching signal is produced from the servo circuit (10) in response to the output of the control head (9) to thereby switch the switch (13) to select the video heads (2c) and (2d) for the first mode operation. It is assumed that the video heads (2c) and (2d) trace the loci (h) and (i) of the video track (52) on the video tape (1) shown in FIG. 6 in the reverse direction at four times the reproduced speed. In this case, the head (2c) traces the recording azimuth (C) whereas the head (2d) traces the recording azimuth (D). According to this operation, reproduced envelope signals shown in FIGS. 7(a) and 7(b) are obtained.

An output signal of the micon (20) is supplied to the comparator (6) through the D/A converter (30) so that four-fifths of the maximum potential of the envelope signal is employed as the comparison potential of the comparator (6). Such a maximum potential has been limited by the preamplifier (3), and therefore the four-fifth potential has been also determined. In this case, the "four-fifths potential" represents a potential to be compared with the level of a signal which is obtained by interpolating the envelope signals on the time base between the two fields. Thus, it is required to select such a potential so that the adjacent envelope signals do not overlap each other. It is the "four-fifths potential" that corresponds to the above described one.

Figure 11:
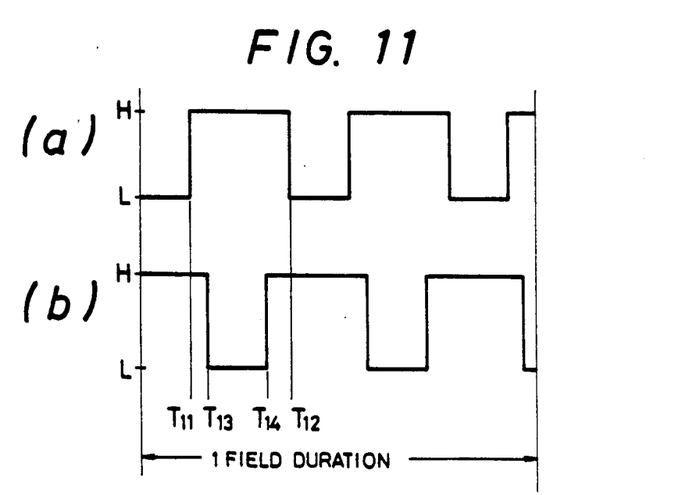

By the application of the thus determined potential as the comparison potential to the comparator (6), output signals as shown in FIGS. 11(a) and 11(b) are produced from the comparator (6). The logic levels of the output signals shown in FIGS. 11(a) and 11(b) represent operation modes, in which (level H) indicates a reading mode and (level L) a writing mode for the field memory (8). In FIGS. 11(a) and 11(b), (T11) and (T12) designate time instants where the inversion time points of the logic level is inverted for the first and second time for the first field. (T13) and (T14) denote the first and second inversion time points of the logic level for the second field, respectively. By measuring the time intervals |T13-T11| and |T12-T14|, it is possible to calculate the predetermined levels of the reproducing signals obtained by interpolating between two fields, corresponding to the time width of the portion at which the level is lower than the four-fifths potential of the envelope signal. The time width of a portion having a low level is large when either the time interval |T13-T11| or |T12-T14| is long whereas the time width is small when the time interval is short.

It is necessary to measure the time interval |T12-T14| in addition to the time interval |T13-T11|, since the reproducing operation is possibly carried out by the different head width in each field. Consequently, the reproducing operation can be performed even when the value of the time interval |T13-T11| differs form the time interval |T12-T14|.

The optimum potential corresponding to each value of the time interval |T13-T11| or |T12-T14| obtained over the two field duration is produced through the D/A converter (30) by referring to the reference table in which the most suitable voltages corresponding to the various |T13-T11| or |T12-T14| are previously set to be supplied to the comparator (6). The reference table is written in the program memory (22) of the micon (20) in advance.

Written on the field memory (8) is the reproduced signal whose envelope interpolated in each field is made continously smoothly and a good quality reproducing picture having the narrowest width noise bar can be obtained by supplying the potential as the comparison reference voltage having the level (S3) shown in FIG. 7(c) to the comparator (6) with respect to the signal recorded on the track (52) of FIG. 6 with reference to the reference table and by supplying the optimum potential with respect to the values of |T13-T11| and |T12-T14| different from each other with reference to the reference table again.

In the second mode, similar operation is carried out by switching over the switch (13) to select the video heads (2e) and (2f) and the same advantageous effect is obtained as mentioned above.

The operation will be described with reference to a flowchart of FIG. 12, where the vertical synchronizing signal is standardized on the time base and a vertical blanking time interval is set to the low level L.

Figure 12:
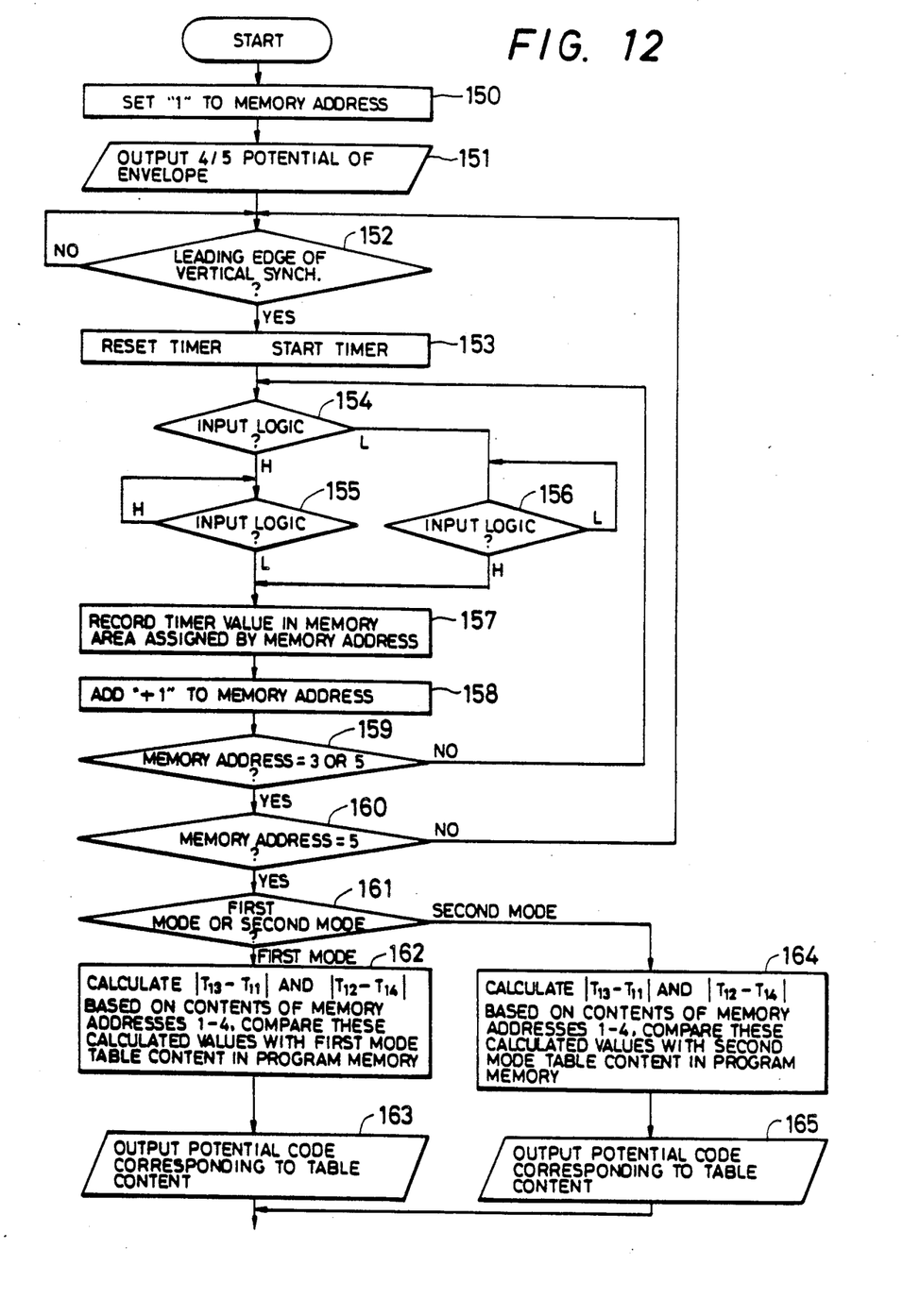
FIG. 12 is a flowchart showing the operation of another embodiment of this invention.

In the flowchart of FIG. 12, the data memory (23) in the micon (20) is first initialized by storing "1" in the address 0 (step (150)).

The potential code is output to the D/A converter (30) through the I/O circuit (21) in order to supply four-fifths of the maximum potential of the envelope signal to the comparator (6) (step (151)).

After the initialization, the timer (24) in the micon (20) is reset and started (step 153) immediately after the leading edge of the vertical synchronizing signal obtained from the video signal processing circuit (4) is detected (step (152)).

Thereafter, a timer value of the timer (24) in the micon (20) is recorded in an area of the data memory (23) (step (157)), if a logic level is inverted with respect to an input level (steps (154, 155, 156)), and a memory address is renewed by adding (+1) thereto (step (158)).

Namely, after the timer value is written to the address 1 which is assigned by the step (150), the address is changed to the address 2.

It is detected whether the address value which is obtained by adding (+1) in the step (158) becomes either "3" or "5" or not (step (159)). This means that the measurement in the first field, that is, the measurement of the time points (T11) and (T12) of FIGS. 11(a) and 11(b) is completed in case of the address value being "3". Further, it also means that the measurement for the second field is also completed when the address value is "5".

When the address value is not any one of "3" or "5", the operation is returned to the step (154) to repeat the measurement. When the address value is "3", the operation advances to the step (160) where it is detected whether the address value is 5 or not. Next, when the address value is "5", the measurement for the time points (T11) through (T14) in the two fields is compltely finished.

When the address value becomes "5", it is detected based on the mode discriminating signal from the servo circuit (10) whether the operation is in the first mode or in the second mode (step (161)). In case of the first mode, the operation advances to the step (162) where the time intervals |T13-T11| and |T12-T14| are calculated based on the contents of the addresses 1 through 4 which correspond to the values of the time intervals (T11 through T14), and these values are compared with a reference value of the first mode which is previously set in the program memory (22) in the micon (20). Recorded in the reference table is the optimum potential to be supplied to the comparator (6), which correspond to the values of |T13-T11| and |T12-T14| which are experimentally obtained for the first mode.

Accordingly, the optimum potential corresponding to the values of the time intervals |T13-T11| and |T12-T14| is selected from the reference table so as to output the potential code (step (163)). The code is a BCD code expression of a binary number. When the operation is in the second mode in the step (161), the operation advances to the step (164). In the step (164), the values of the time intervals |T13-T11| and |T12-T14| is is calculated based upon the contents of the reference table at the addresses 1 to 4 so as to be compared with the value of the reference table for the second mode. The potential code corresponding to the contents of the reference table is produced (step (165)).

In the above described embodiment, although four-fifths of the maximum potential of the envelope signal is output in the step (151), it is not limited thereto, but any potential may be available, even if the adjacent signals do not overlap each other when the envelope signals are interpolated between the two fields. In this case, the same advantage as that of the above embodiment can be obtained by rewriting the content of the reference table according to the selected potential.

Figure 13:
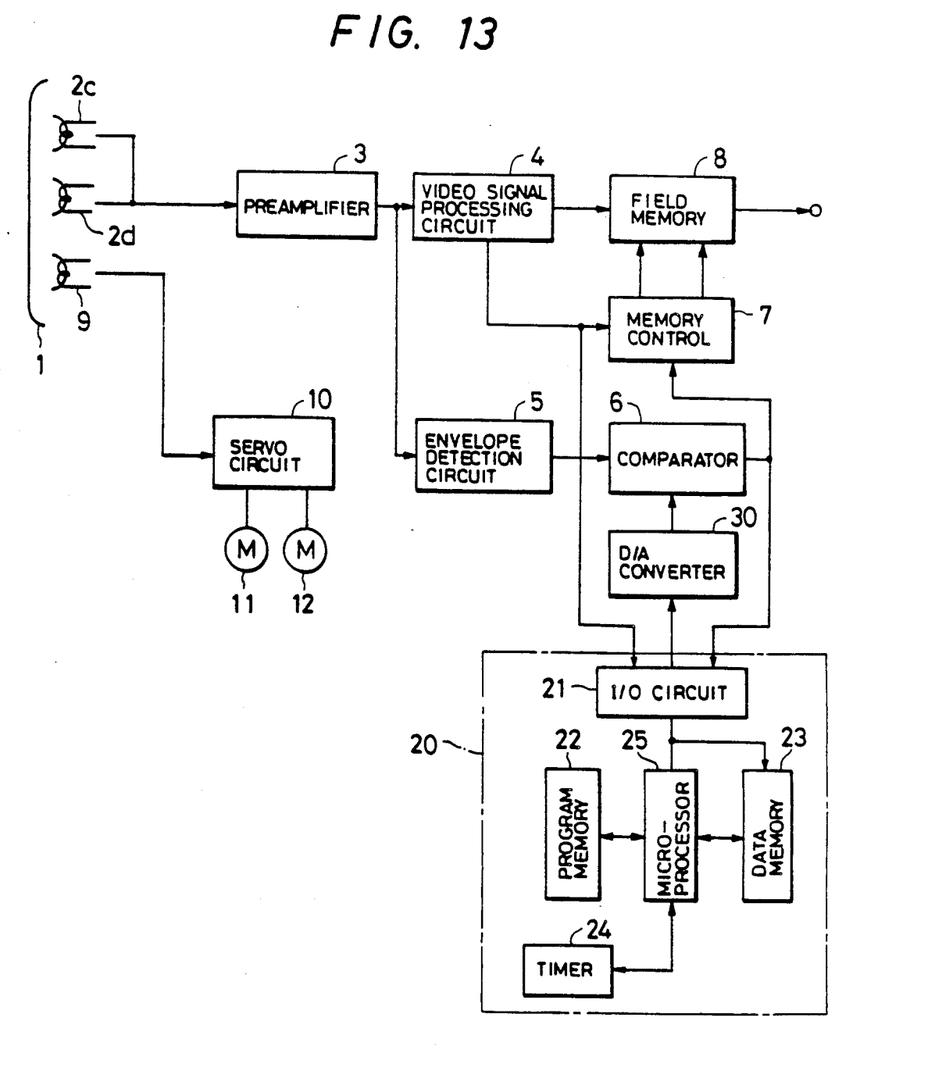
FIG. 13 is a block diagram showing a further embodiment of this invention.

Further, the description will be made as to a video image reproducing apparatus having only one high speed reproducing mode with reference to FIG. 13. The difference between the apparatus of FIG. 13 and that of FIG. 8 resides in that the appratus of FIG. 13 is provide with two heads for performing the high speed reproducing operation in one mode and means for selecting the head and the reference table to be used in the operation mode is removed therefrom. Due to the omission of the means for selecting, the steps (109, 112 and 113) may be removed from the operation flow chart shown in FIG. 10. Steps (161, 164 and 165 are similarly not required for the operation shown) in FIG. 12. The remaining operation can be performed in the same manner as those of the other embodiments.

Although the switch (13) is provided at the rear side of the magnetic heads (2c), (2d), (2e) and (2f) in the above described embodiments, modification having the advantages are possible by providing a plurality of preamplifiers to the switches (2c), (2d), (2e) and (2f), respectively.

Further, a hardware system can be used instead of the micon which is used as the control means in the above embodiments.

Furthermore, ordinary memory can be used instead of the dual-port or the multi-port field memory used in the above embodiments.

Moreover, the picture reproducing apparatus is also applicable to reproducing operations such as slow-motion reproducing, still reproducing and the like, the reproducing speed of which is different from that of ordinary reproducing.

We claim:

1. A video image reproducing apparatus of the type having comparison means for comparing the level of a reproducing signal from a recorded magnetic tape to a predetermined level and for storing the reproducing signal in a field memory when said level of said reproducing signal is higher than said predetermined level, with a reproduced image being obtained according to data read out from said field memory, said reproducing apparatus further comprising:

at least two magnetic heads for reading the reproducing signal from said magnetic tape on which inclined recording tracks are formed with respect to a running direction of the magnetic tape;

a recording track width measuring means for measuring a width of the recording track based on an envelope detecting signal of the reproducing signal from said magnetic heads; and a level setting means for automatically varying said predetermined level to an optimum level for the signal reproduction based on the result of the measurement of the track width.

2. The apparatus as claimed in claim 1 wherein the width of said magnetic heads is larger than a recording track pitch.

3. The apparatus as claimed in claim 1 wherein said recording track width measuring means comprises a comparator slicing the envelope detecting signal with a predetermined level to output a binary-coded signal and means for measuring a writing mode width of the binary-coded signal from said comparator.

4. The apparatus as claimed in claim 3 wherein said level setting means includes a reference table for storing data corresponding to a plurality of values for said predetermined level, and means responsive to the writing mode width from said recording track width measuring means for reading one of the stored values from said reference table as the predetermined level.

5. A video image reproducing apparatus of the type having comparison means for comparing the level of a reproducing signal from a recorded magnetic tape to a predetermined level and for storing the reproducing signal in a field memory when said level of said reproducing signal is higher than said predetermined level, with a reproduced image being obtained according to data read out from said field memory, said reproducing apparatus further comprising:

at least two magnetic heads for reading the reproducing signal from said magnetic tape on which inclined recording tracks are formed with respect to a running direction of the magnetic tape;

a measuring means for measuring a time width of a portion of a signal obtained by interpolating envelope detecting signals of the reproducing signals from said magnetic heads with each other on a time base between two fields, the signal level of the portion thereof being lower than a second predetermined level; and a level setting means for automatically varying said first predetermined level to an optimum level for signal reproduction based on the measurement result of said measuring means.

6. The apparatus as claimed in claim 5 wherein the width of said magnetic heads is larger than a recording track pitch.

7. The apparatus as claimed in claim 5 wherein said measuring means comprises a comparator slicing the envelope detecting signal corresponding to each of said two magnetic heads with a predetermined level to output a binary-coded signal; and means for measuring a leading edge time point and a trailing edge time point of the binary-coded signal of said comparator to calculate a time width which represents a time difference between the leading edge time point of the binary-coded signal corresponding to one of said two magnetic heads and the trailing-edge time point thereof corresponding to the other magnetic head.

8. The apparatus as claimed in claim 7 wherein said level setting means includes a reference table for storing data corresponding to a plurality of values for said predetermined level, and means responsive to the time width from said measuring means for reading one of the stored values from said reference table as said predetermined level.

9. A video image reproducing apparatus wherein when the level of a reproducing signal from a recorded magnetic tape is higher than a predetermined level, the reproducing signal is stored in a field memory, and a reproduced image is obtained according to data read out from said field memory, said reproducing apparatus comprising:

a first set of at least two magnetic heads for use in a first mode to carry out reproduction at a first tape feeding speed;

a second set of at least two magnetic heads provided independently from said first set of magnetic heads, said second set of magnetic heads being used in a second mode where reproduction is carried out at a second tape feeding speed which is lower than that used in the first mode;

a mode discriminating means for discriminating whether the operation mode is in said first mode or said second mode, to produce a mode discriminating signal;

a head switching means for selectively outputting an output from each of said magnetic heads in response to the mode discriminating signal;

a recorded track width detecting means for measuring a recorded track width based on an envelope detecting signal of the reproducing signal obtained when said magnetic heads traverse a recording track of said magnetic tape;

a first level setting means for automatically setting the predetermined level to an optimum level for signal reproduction in the first mode based on the measurement result of said measuring means, and a second level setting means automatically for setting the predetermined level to an optimum level for signal reproduction in the second mode based on the measurement result; and a switching means for selectively operating one of said first and second level setting means based on the mode discriminating signal.

10. The apparatus as claimed in claim 9 wherein the width of said magnetic head for the first mode is set to be larger than a recording track pitch of the magnetic tape.

11. The apparatus as claimed in claim 9 wherein said recording track width measuring means comprises a comparator for slicing the envelope detecting signal with the predetermined level to output a binary-coded signal and means for measuring a reading mode width of the binary-coded signal from said comparator.

12. The apparatus as claimed in claim 11 wherein said first and second level setting means include reference table means for storing data corresponding to a plurality of values of said predetermined level, and means responsive for reading one of the stored values from said reference table means as said predetermined level.

13. A video image reproducing apparatus wherein when the level of a reproducing signal from a recorded magnetic tape is higher than a first predetermined level, the reproducing signal is stored in a field memory, and a reproduced image is obtained according to data read out from said field memory, said reproducing apparatus comprising:

a first set of at least two magnetic heads for use in a first mode to carry out reproduction at a first tape feeding speed;

a second set of at least two magnetic heads provided independently from said first set of magnetic heads, said second set of magnetic heads being used in a second mode where reproduction is carried out at a second tape feeding speed which is lower than that used in the first mode;

a mode discriminating means for discriminating whether the operation mode is in said first mode or said second mode, to produce a mode discriminating signal;

a head switching means for selectively outputting an output from each of said magnetic heads in response to the mode discriminating signal;

a measuring means for measuring a time width of a signal which is obtained by interpolating envelope detecting signals of the reproducing signal with each other between two fields, the level of said signal being lower than a second predetermined level and said signal being obtained when each of said magnetic heads traverse said magnetic tape;

a first level setting means for automatically setting said first predetermined level to an optimum level for signal reproduction in the first mode based on the measurement result of said measuring means, and a second level setting means for automatically setting said first predetermined level to an optimum potential during signal reproduction in said second mode based on the measurement result; and means for selectively operating one of said first and second level setting means based on the mode discriminating means.

14. The apparatus as claimed in claim 13 wherein the width of said magnetic head for the first mode is set larger than a recording track pitch of the magnetic tape.

15. The apparatus as claimed in claim 13 wherein said measuring means comprises a comparator for slicing envelope detecting signals corresponding to said two magnetic heads with the predetermined level respectively, to and output a binary-coded signal and means for measuring the time point when the leading edge of the binary-coded signal occurs and the time point when the trailing edge thereof occurs, to calculate a time width representing a difference between the leading edge time points of the signal for one of said set of magnetic heads and the trailing edge time points of the signal for the other set of magnetic heads.

16. The apparatus as claimed in claim 15, wherein said first and second level setting means include reference table means for storing data corresponding to a plurality of values of said predetermined level, and means responsive to a time width from the measuring means for reading one of the stored values from said reference table means as said predetermined level.

17. The apparatus as claimed in claim 1 wherein said optimum level is one-third of a maximum potential of said envelope detecting signal.

18. The apparatus as claimed in claim 5 wherein said first predetermined level is four-fifths of a maximum potential of said envelope detecting signals.

19. The apparatus as claimed in claim 9 wherein said optimum level is one-third of a maximum potential of said envelope detecting signal.

20. The apparatus as claimed in claim 13 wherein said first predetermined level is four-fifths of a maximum potential of said envelope detecting signals.

* * * * *